Figure 1:
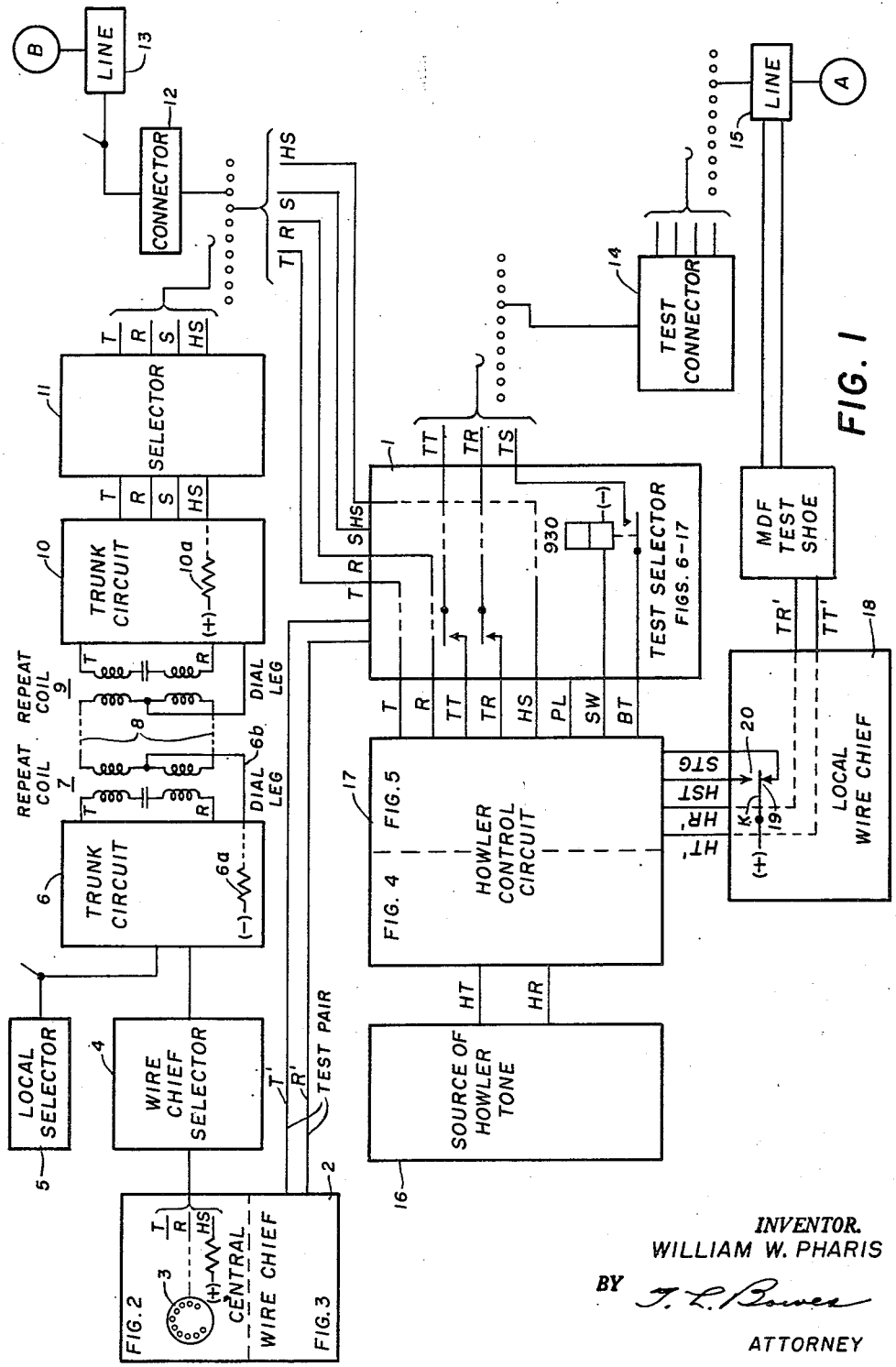

March 12, 1957

W. W. PHARIS 2,785,237

HOWLER CONTROL CIRCUIT

Filed April 5, 1954

16 Sheets-Sheet 1

INVENTOR.
WILLIAM W. PHARIS
BY
ATTORNEY

March 12, 1957 W. W. PHARIS 2,785,237
HOWLER CONTROL CIRCUIT
Filed April 5, 1954 16 Sheets-Sheet 3

March 12, 1957

W. W. PHARIS 2,785,237

HOWLER CONTROL CIRCUIT

Filed April 5, 1954

16 Sheets—Sheet 14

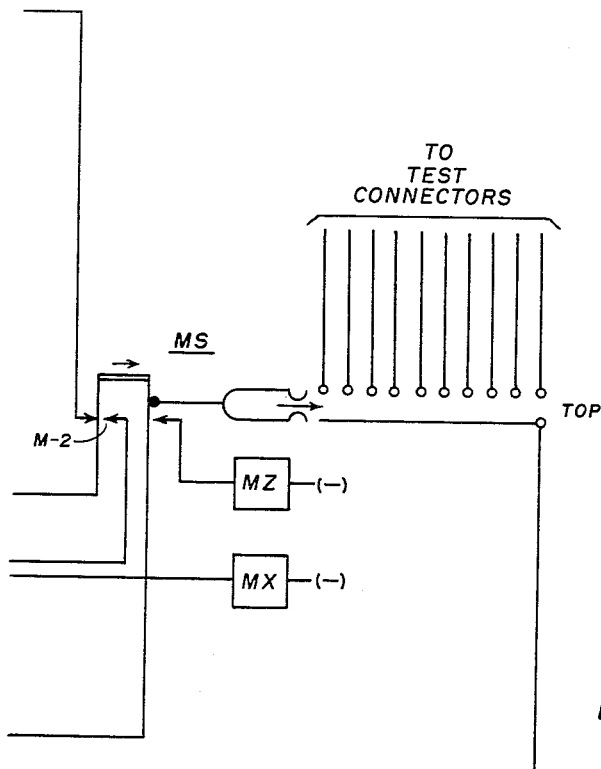

United States Patent Office …

2,785,237
Patented Mar. 12, 1957

2,785,237

HOWLER CONTROL CIRCUIT

William W. Pharis, Rochester, N. Y., assignor, by mesne assignments, to General Dynamics Corporation, a corporation of Delaware Application April 5, 1954, Serial No. 420,777

14 Claims. (Cl. 179—175.2)

This invention relates to a howler control circuit and more particularly to circuit means for enabling an operator or a wire chief to connect and disconnect a source of howler tone to a subscriber's line in order to attract attention at a subscriber's station to an off-hook or unrestored condition of the receiver or handset.

Means is conventionally provided in telephone systems for connecting a howler tone to a subscriber's line under conditions indicating an off-hook or unrestored handset condition. Means is also conventionally provided, as by means of a test selector and a test connector, for enabling a series of tests to be made on individual lines, as for example, by a wire chief.

It is an object of my invention to provide a new and improved circuit for enabling access to a howler circuit or source of howler tone from a wire chief's or the like test set.

It is another object of my invention to provide a new and improved circuit which prevents access to a source of howler tone and returns busy tone if an attempt is made to use a busy howler control circuit.

Still another object of my invention is to provide a new and improved howler control circuit for enabling the establishment of monitoring connections to a line under test.

Yet another object of my invention is to provide a new and improved circuit for applying howler tone following a period of monitoring of the line to which the howler tone is to be connected.

Still another object of my invention is to provide a new and improved howler control circuit for enabling the removal of howler tone and the reestablishment of monitoring conditions.

Yet another object of my invention is to provide a howler control circuit comprising means for monitoring a line, applying howler tone thereto, and thereafter reapplying howler tone.

In accordance with the principles of my invention, there is provided a howler control circuit which is so designed as to permit control of a source of howler tone from a wire chief's test set either directly from a local office or from a distant office through a test selector. My invention is particularly adapted for use with a testing system whereby or wherein different tests are made by dialing different digits. My circuit is arranged such that access to the howler control circuit is provided by the dialing of another predetermined digit, as for example the digit "5." If the howler control circuit is busy, busy tone is returned to the calling position whereas, if the howler control circuit is idle, a connection may be extended to the selected line for monitoring purposes. If it is decided to apply howler tone to the line, the wire chief may dial still another predetermined digit, which in the present embodiment of my invention is the same number, i. e., "5." Means is also provided for removing howler tone and for restoring monitoring conditions, and for enabling the wire chief to reapply howler tone by dialing another digit which is preferably the same numeral, i. e., "5." Means is provided in the switch train between the test position and the test selector for effecting seizure of a howler tone control circuit in the form of a marking potential at any desired point, as in a trunk for example. My system also includes means for permitting access to the control circuit from a plurality of test positions but the circuits are arranged so that howler tone can be applied only from one position at a time.

Figure 2:
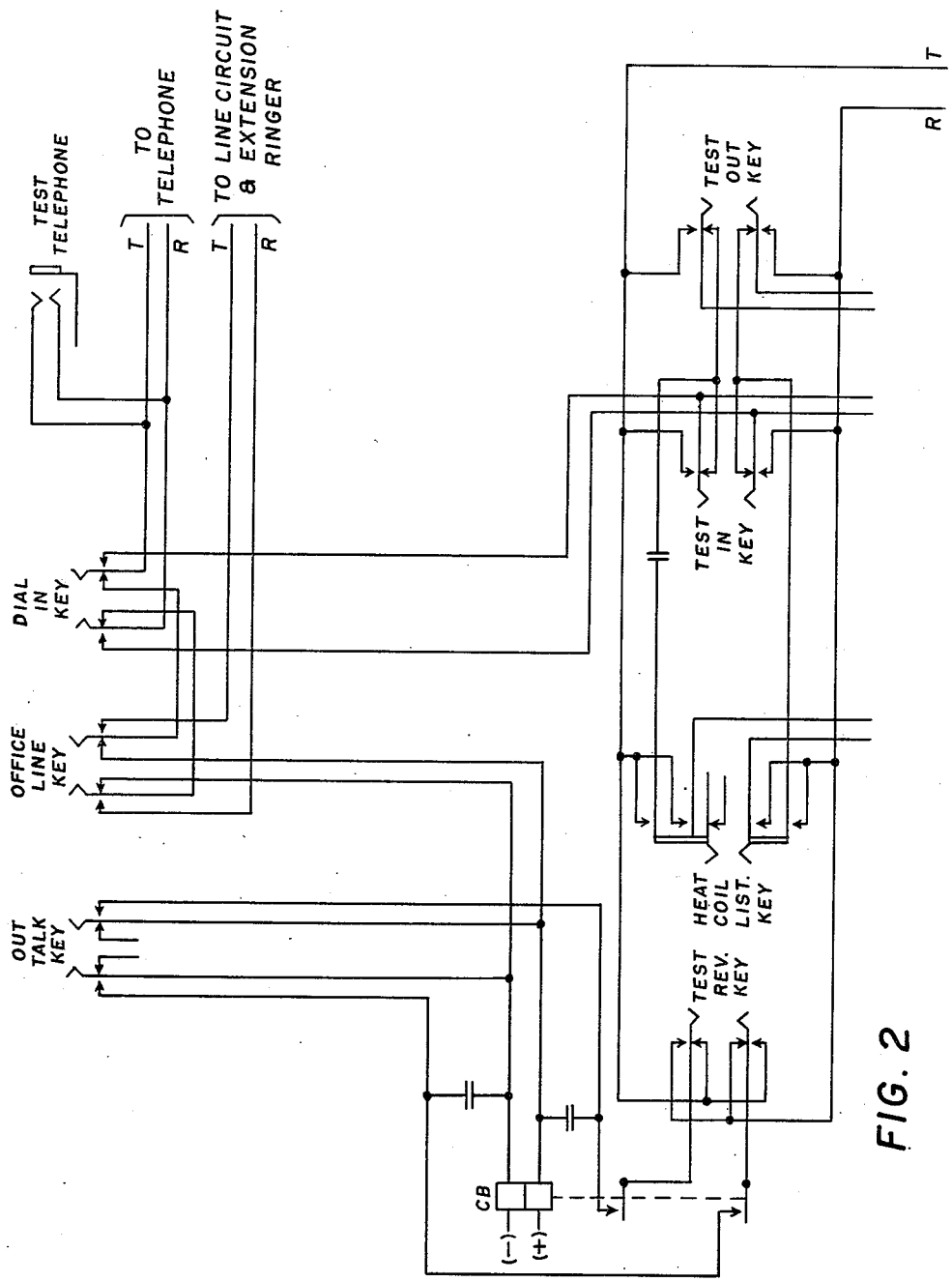
Figure 3:
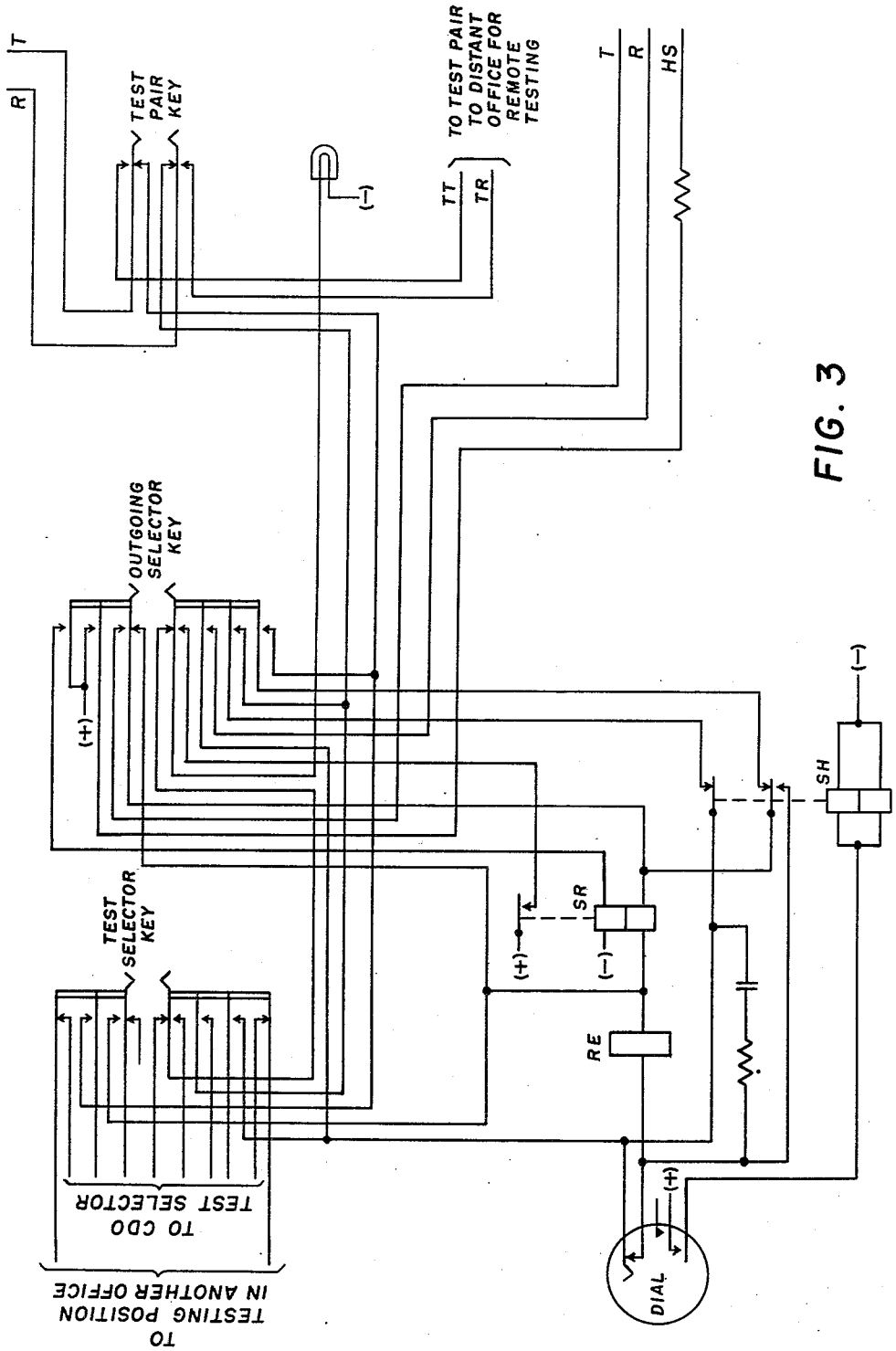
Figure 4:
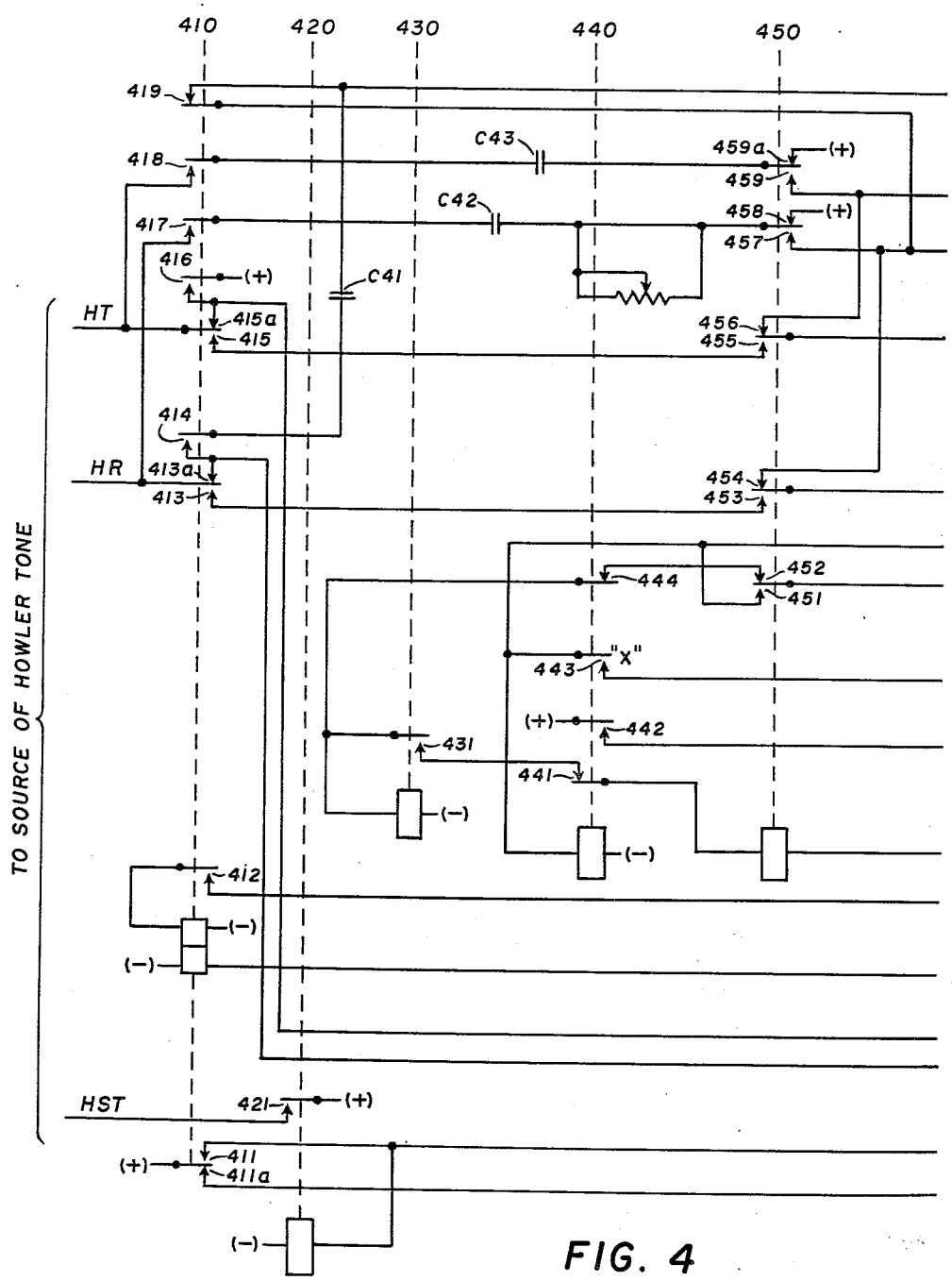
Figure 5:
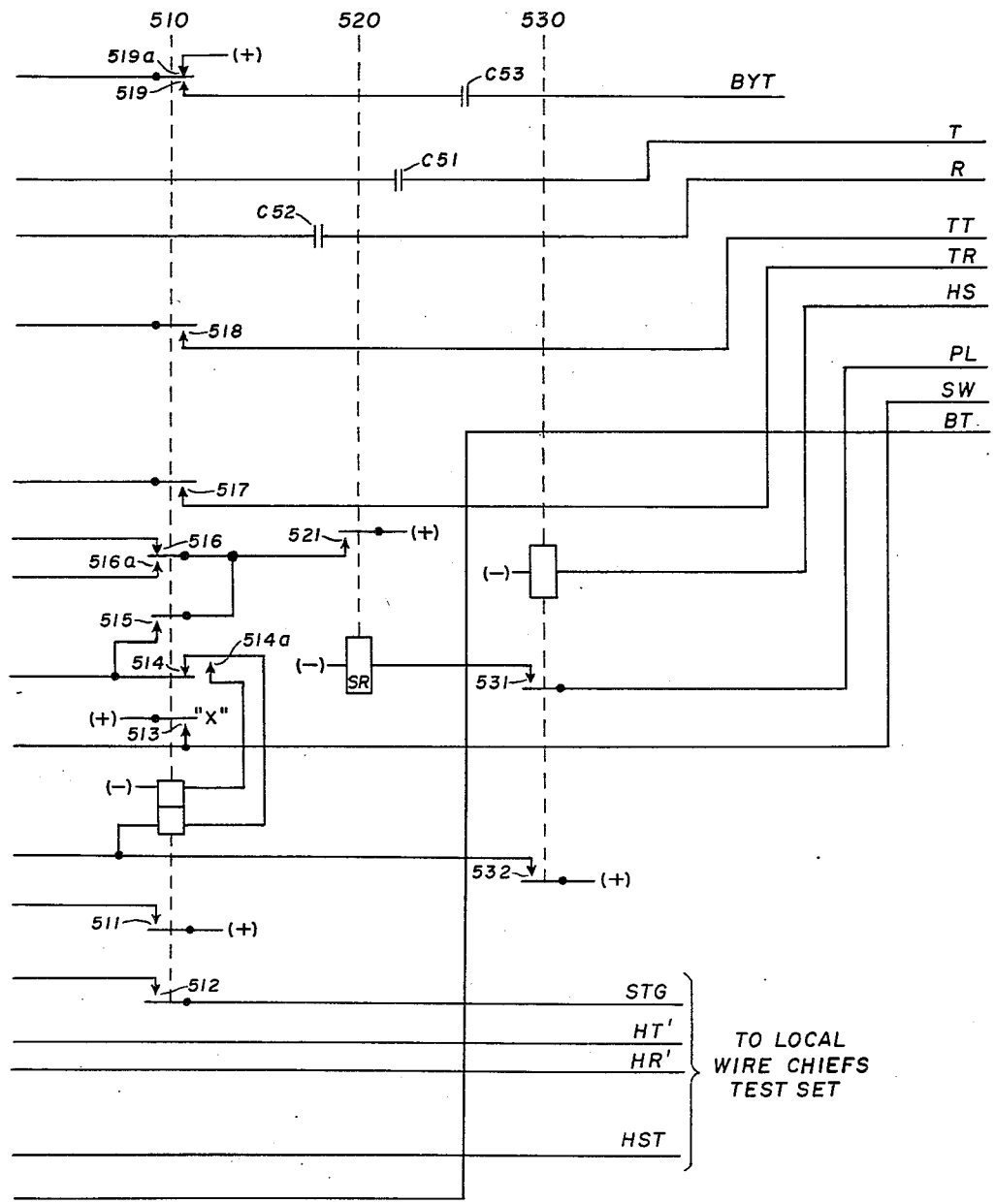
Figure 6:
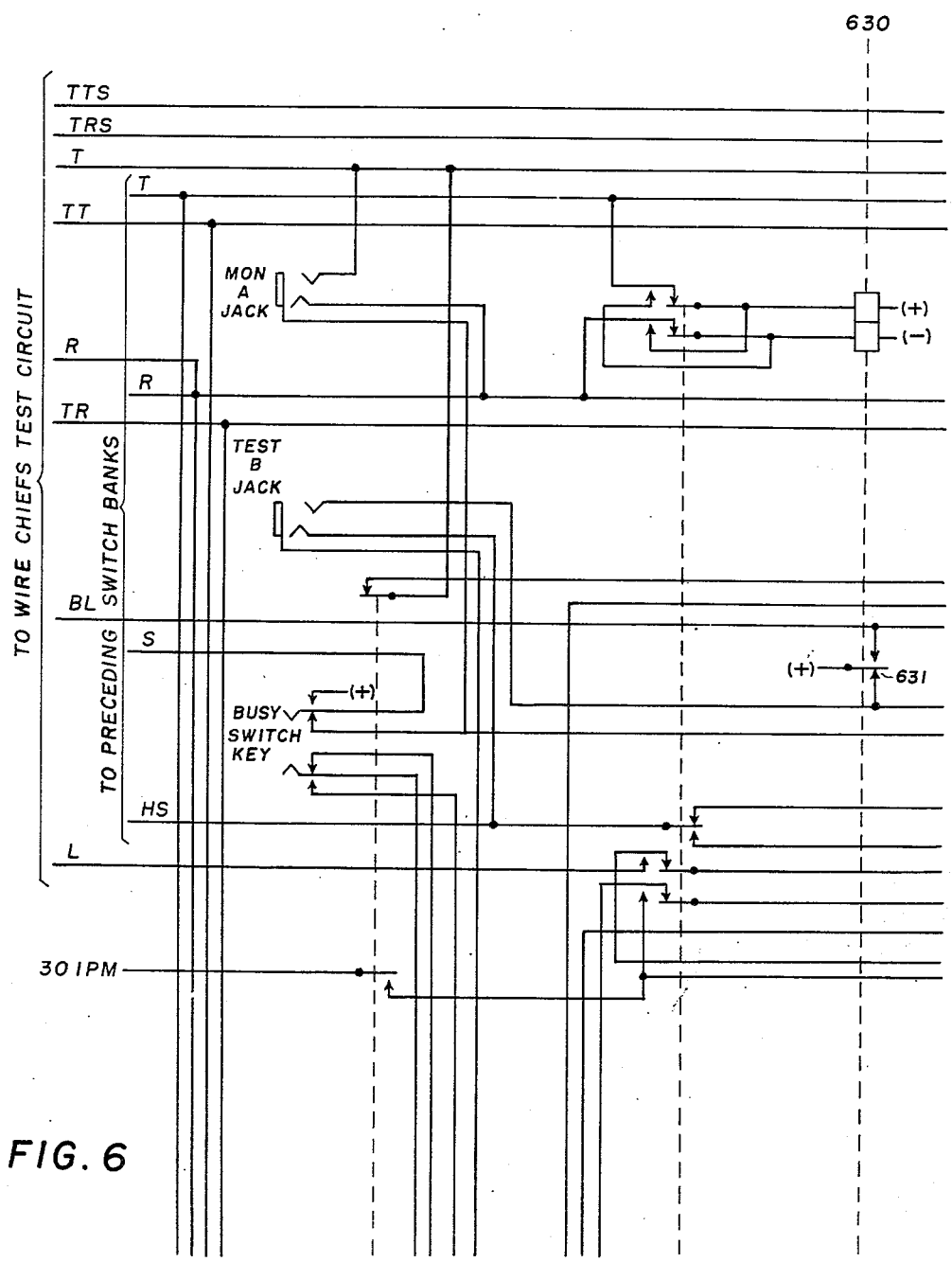
Figure 7:
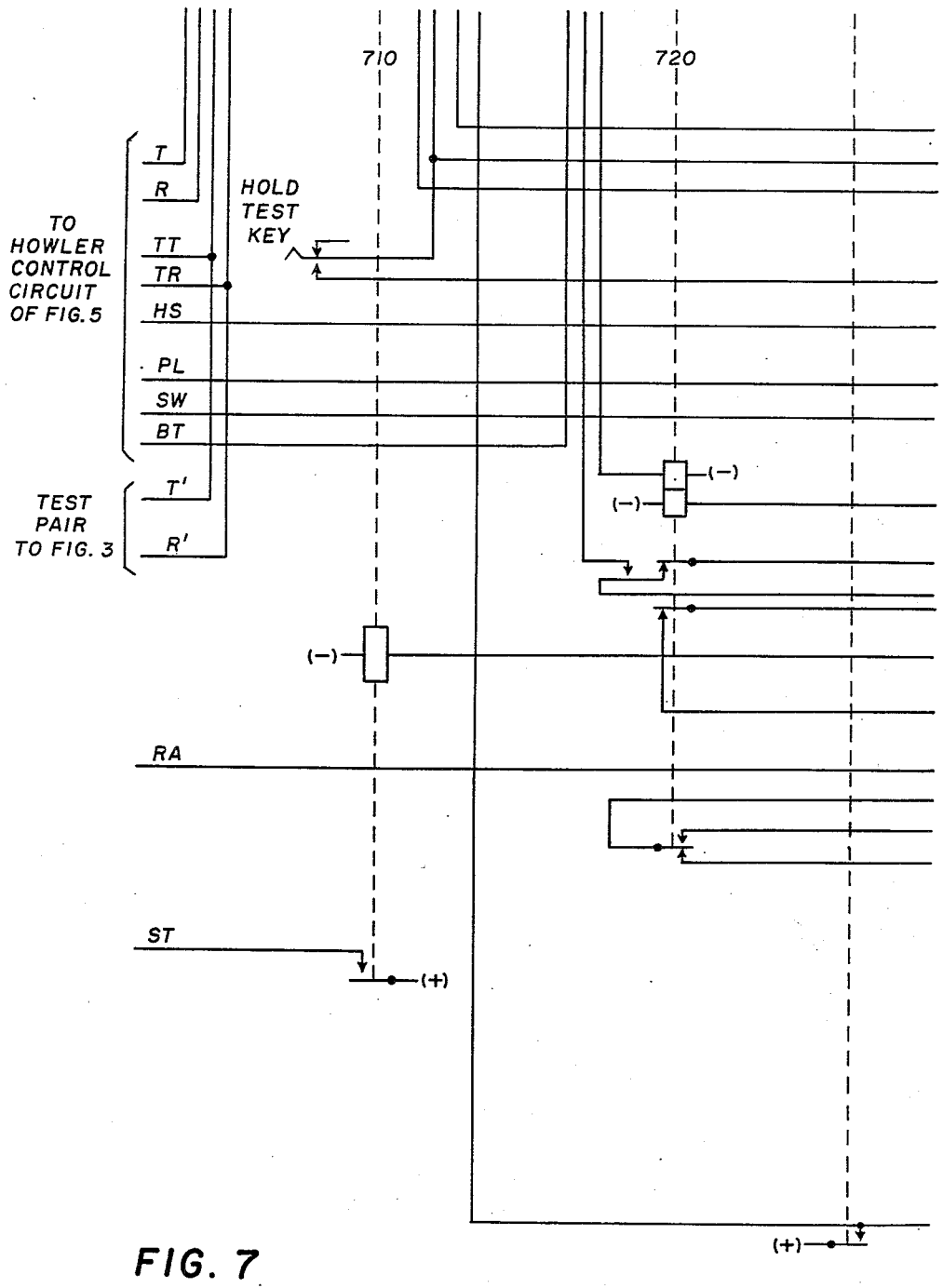
Figure 8:
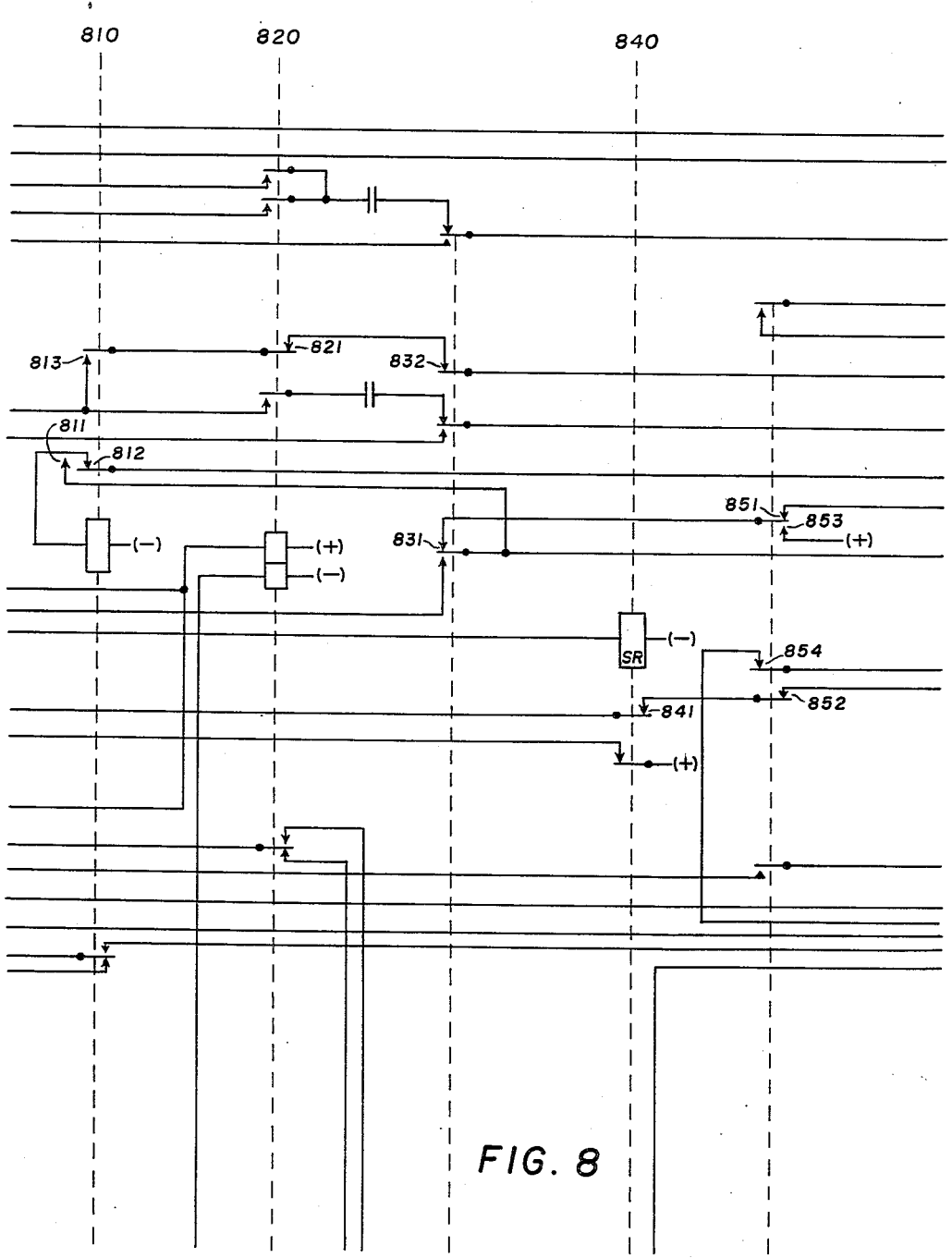
Figure 9:
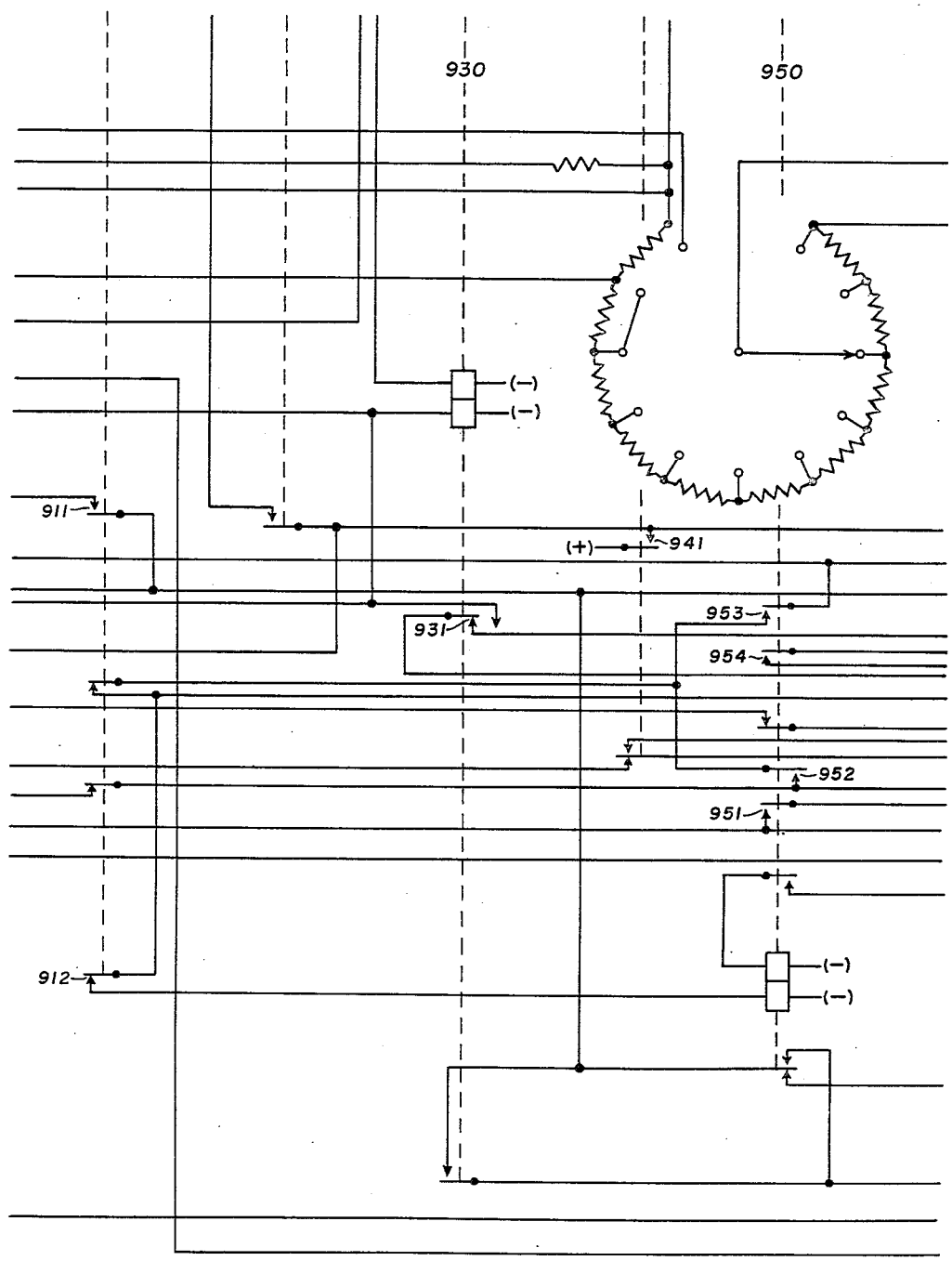
Figure 10:
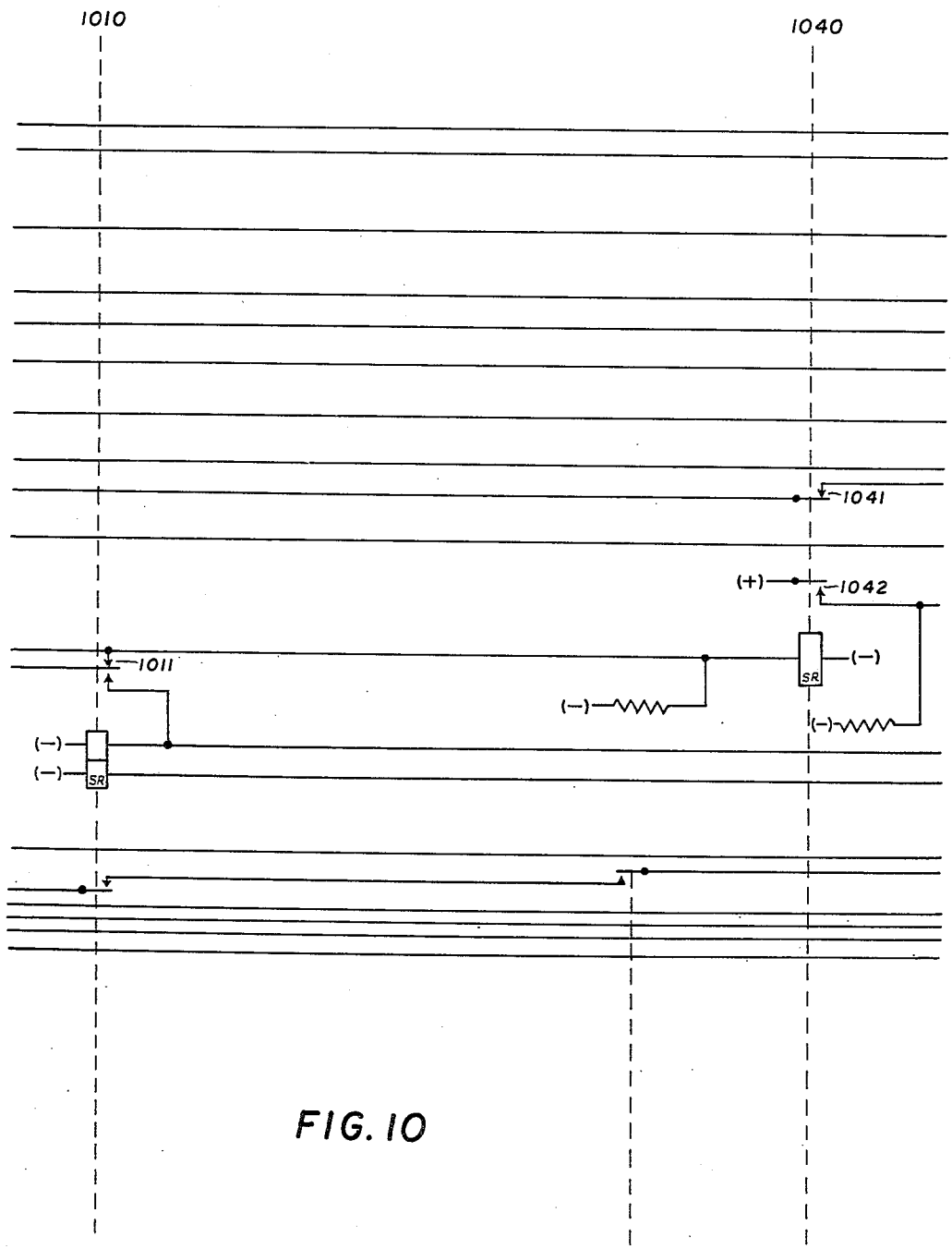
Figure 11:
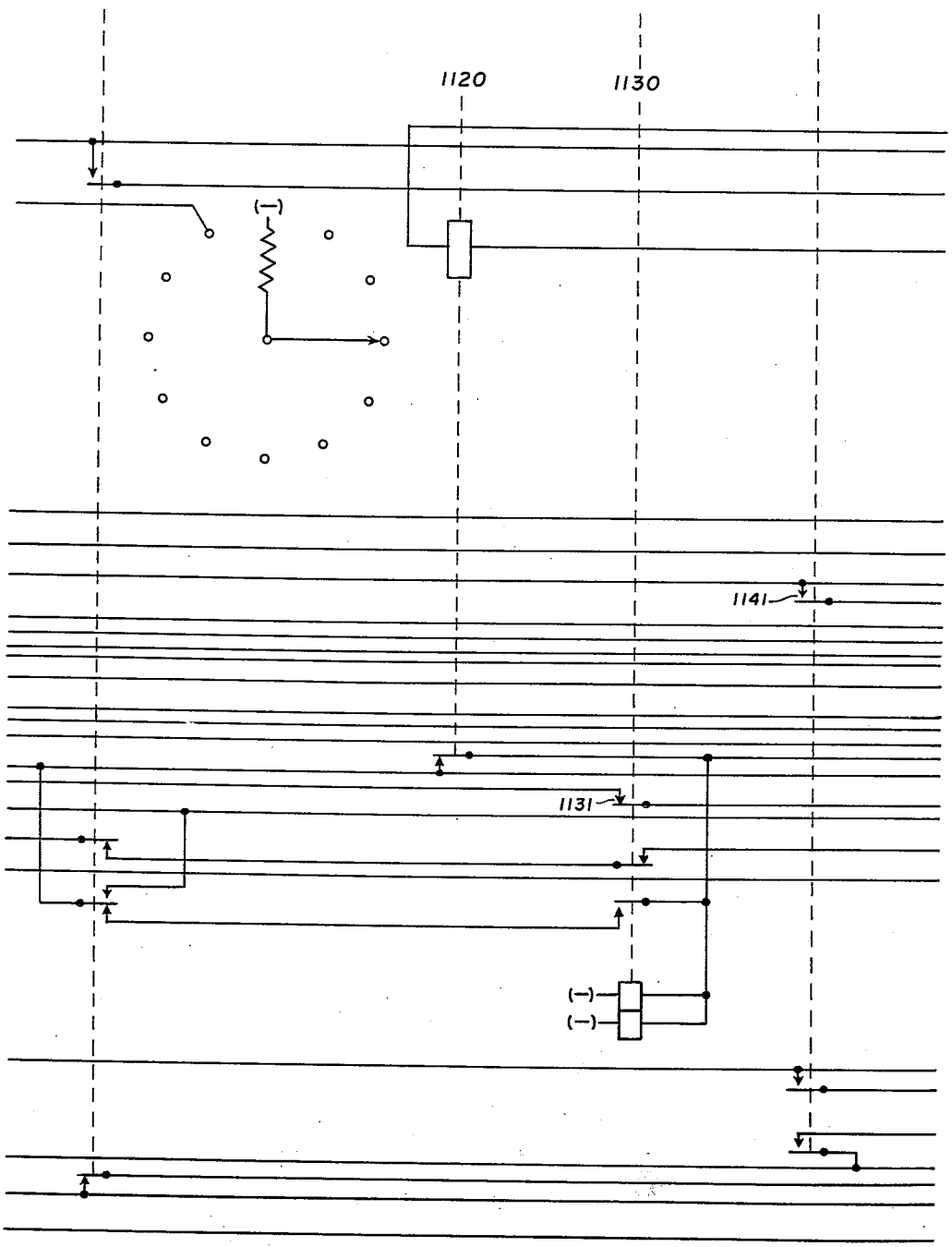
Figure 12:
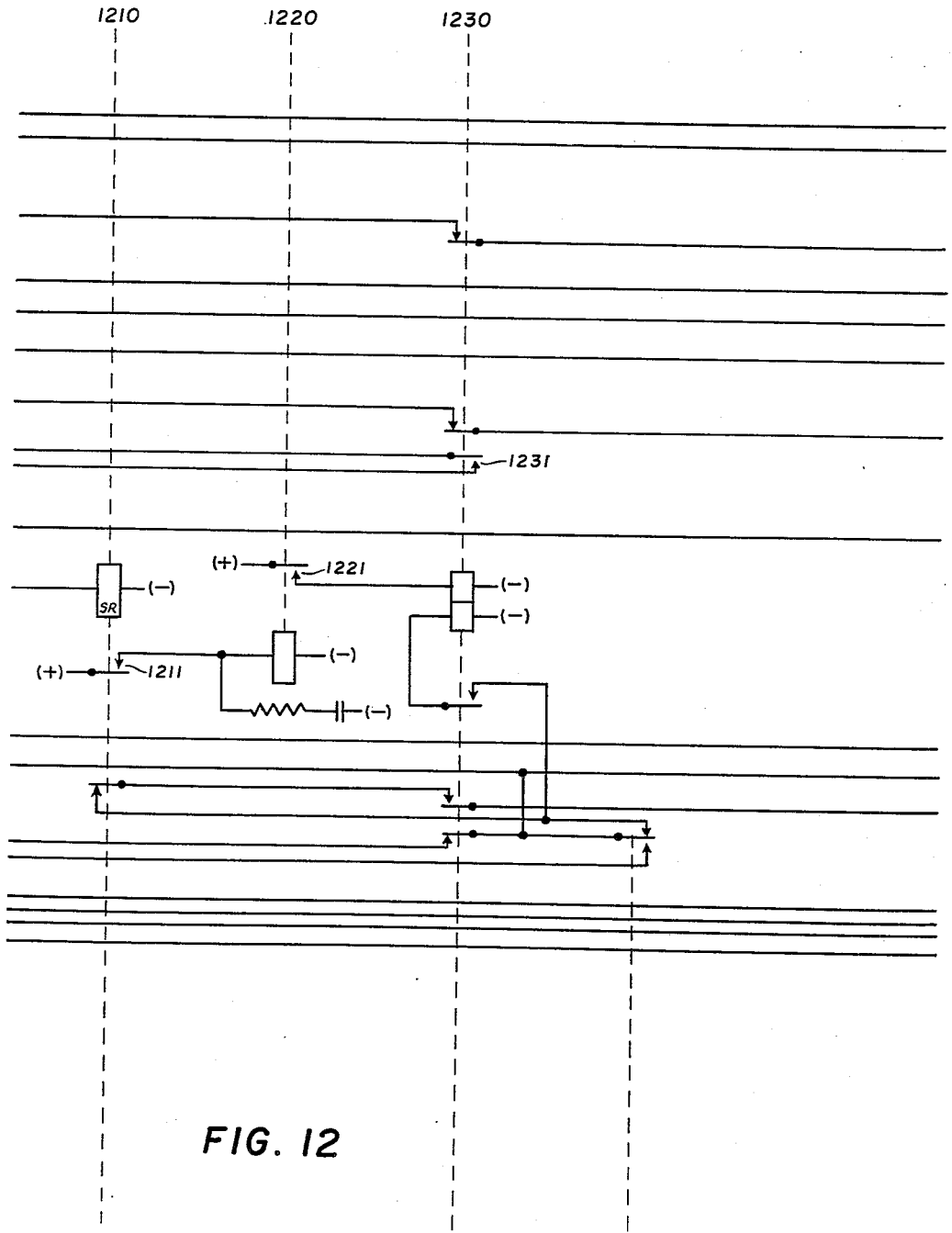
Figure 13:
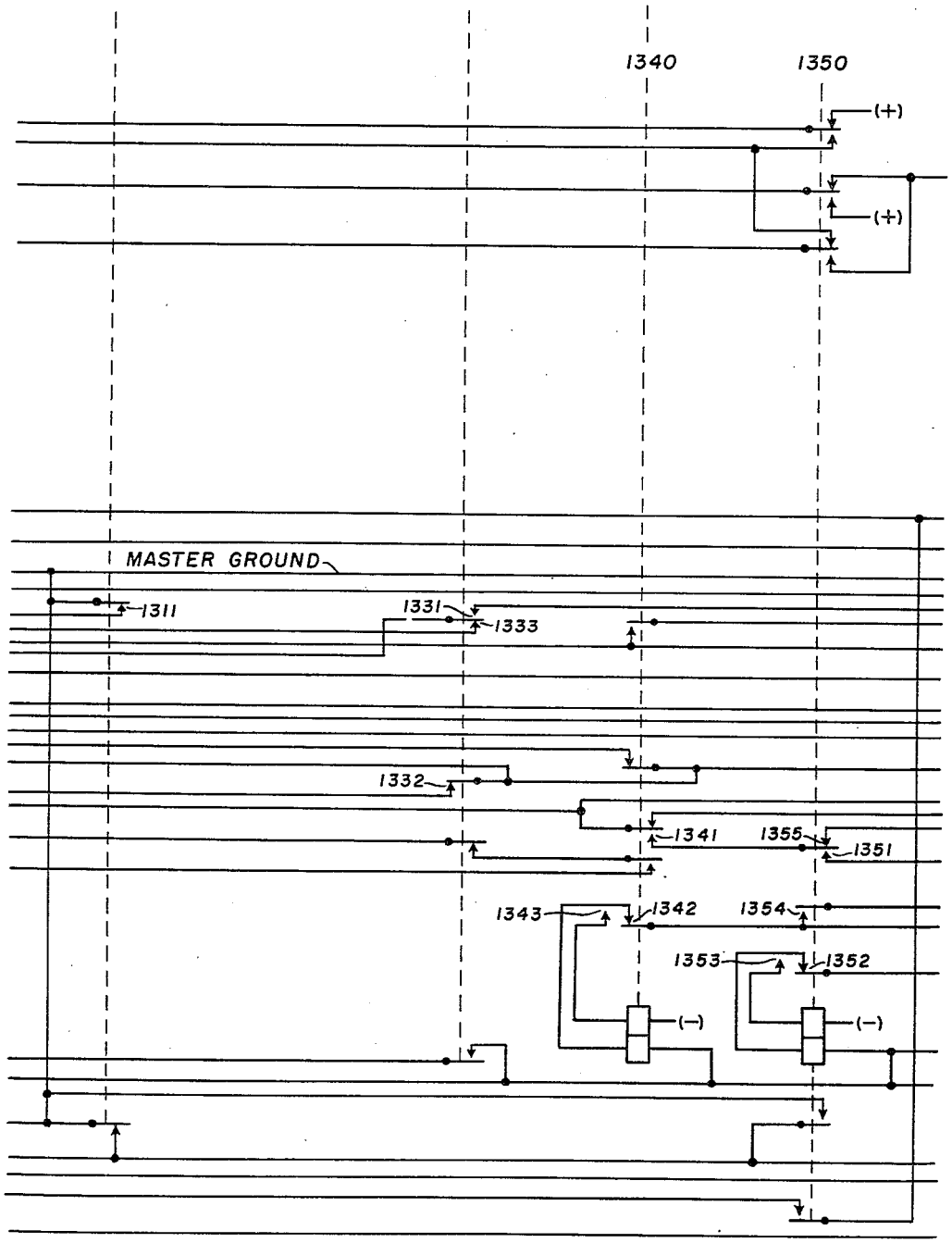
Figure 14:
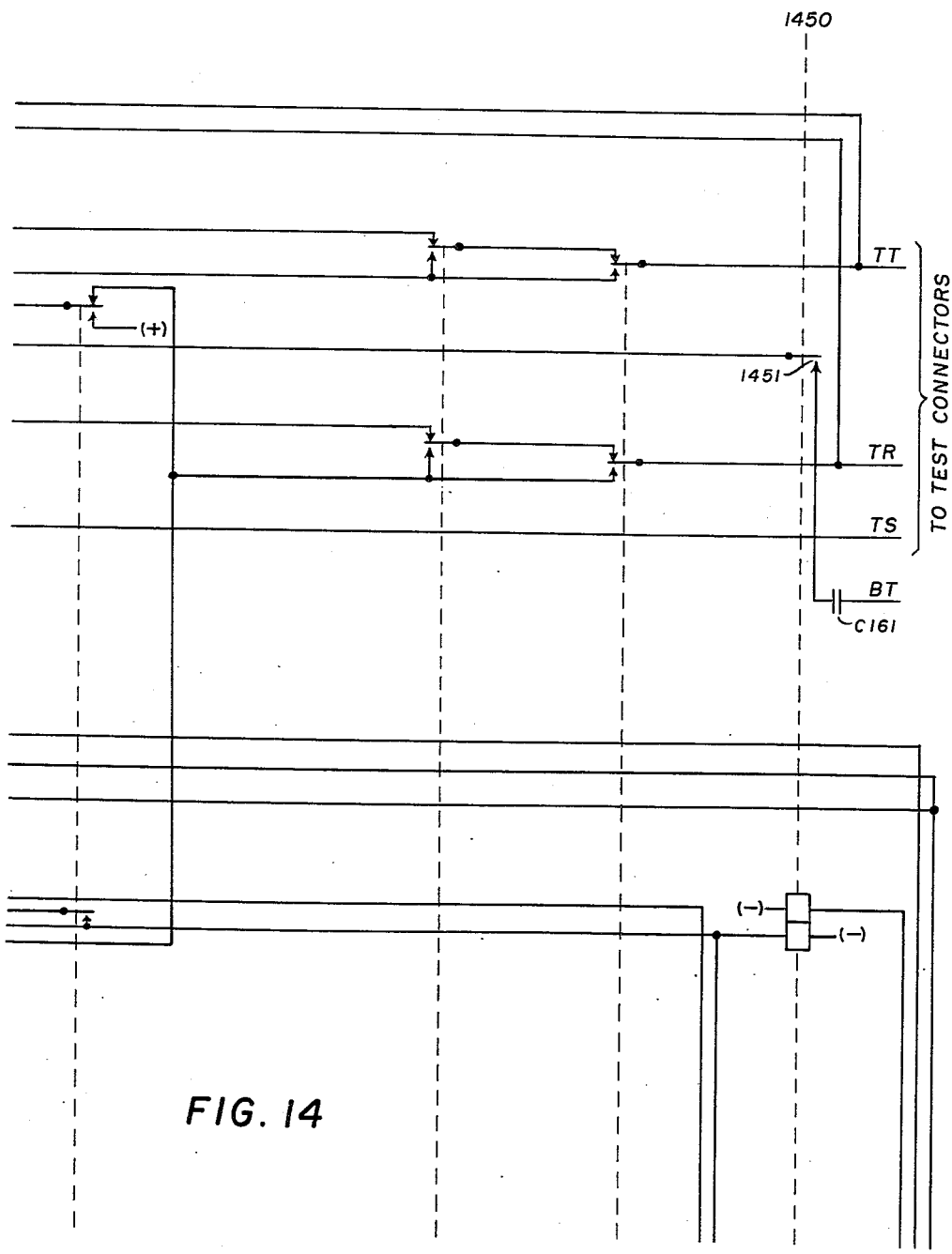
Figure 15:
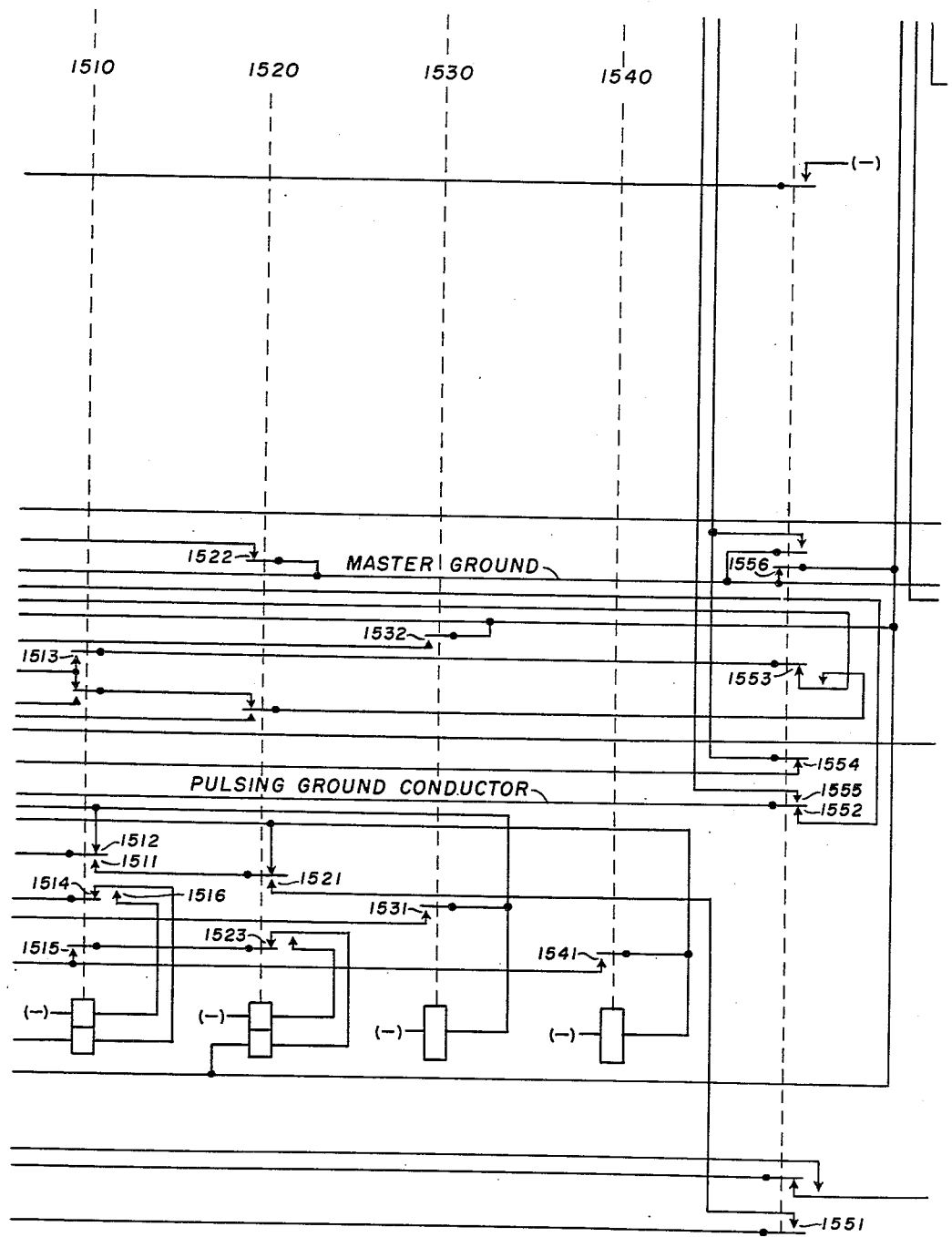

Further objects and advantages of my invention will be apparent from a reading of the following description when considered in conjunction with the various drawings of which Fig. 1 is a block diagram of a telephone system embodying the principles of my invention, Figs. 2 and 3 comprise a partial disclosure of a wire chief's position, Figs. 4 and 5 illustrate circuit details of a howler control circuit embodying the principles of my invention, and Figs. 6 to 17, inclusive, illustrate in detail a test selector suitable for use with the control circuit of Figs. 4 and 5.

Referring to the block diagram of Fig. 1, means is provided for testing subscriber's line A. In general, conventional circuits may be employed in the system disclosed in Fig. 1 with the exceptions brought out as the description proceeds. Any special features required in otherwise conventional circuits where such circuits are not detailed, are specifically set forth in the drawing and in the description. This procedure has been adopted in order to minimize the length of the application and particularly to minimize the number of sheets of drawings. This procedure is believed to be justified because all circuits not disclosed in complete detail are conventional and well within the skill of the art.

In Fig. 1 there is represented by the numeral 1 a test selector. In order to seize the test selector for the performance of routine tests such as the testing of a line for battery potential, ground potential, leakage resistance, the busy test of the line involved, and to monitor a busy line if the call originates at a test desk, there is provided a central wire chief's position 2, designated in Fig. 1 as the central wire chief. By means of the operation of dial 3 at wire chief's position 2, wire chief selector 4 is seized in conventional manner. Wire chief selector 4, as well as a plurality of local selectors 5, have access to a suitable outgoing trunk circuit 6 through which a call can be extended through suitable repeating coils 7, line 8, repeating coils 9, and incoming trunk 10, to selector 11.

Trunk 6 is preferably arranged to supply battery through resistor 6a to dial leg 6b. At this point it is noted that the station batteries used in this system are conventionally arranged so that the positive terminals thereof are grounded and are hereinafter referred to as "ground" or indicated by the symbol (+) and the negative terminals are indicated by the symbol (−) or will be referred to hereinafter as "battery."

Trunk 10 is arranged to apply resistance ground to the HS lead extending between trunk circuit 10 and selector 11 as indicated by the symbol (+) and resistor 10a connected to lead HS by a dashed line. Calls may be extended through conventional connectors, such as indicated by the numeral 12, to lines such as line circuit 13 which extends to subscriber B. On calls from wire chief position 2, however, selector 11 may be connected directly to levels terminating in test selectors such as indicated by the numeral 1 and shown in detail in Figs. 6 to 17, inclusive.

The switch, preferably of the step-by-step type, associated with test selector 1, can be operated, as will be described in detail hereinafter, to extend test calls to subscriber A through a suitable test connector 14 and line circuit 15. Means is thus established, provided test selector 1 is not busy, for testing line A via the test pair T' and R', extending between central wire chief position 2 and test selector 1.

Inasmuch as the test selector shown in Figs. 6 to 17, inclusive, is not part of my invention, only a minimum amount of description will be provided as a means for understanding the application of the principles of my invention to a telephone system. At this point it will merely be noted that test selector 1 is shown as a CDO type line testing and verification selector circuit and provides one test path multipled to all test connectors in an office and has an individual control lead for each test connector. Access to the test selector is had from the selector bank and wire chief's test set. The particular test selector disclosed herein selects the desired test connector in response to the first or second digit dialed into the test selector, optional wiring permitting absorption of the first digit dialed into the test selector, if desired. Means is also provided for stepping the selector test connector to the desired line in response to the next two dialed digits whereupon automatic line testing is started when the final (ringing) digit of the line to be tested is dialed if that line is found to be free. Automatic line tests comprise reverse battery clicks to regular lines or lamp flashes and clicks to the wire chief or a toll operator to indicate the following conditions: battery insulation fault, ground insulation fault, loop insulation fault, and no fault. The circuit is arranged to return answer supervision if the dialed line is found busy.

If the wire chief wishes to apply a howler tone to the line extending to subscriber A, a predetermined digit such as "5," is dialed which serves to connect a source of howler tone 16 to the howler control circuit 17 and the latter is connected to subscriber A through test selector 1, test connector 14 and line circuit 15.

A local wire chief, indicated by the numeral 18, can also apply the howler tone source from his position. In conventional practice, there would be used an MDF frame or a connection would be set up through the test selector and tone applied by operating a suitable key such as that indicated by the numeral 19 in the local wire chief test apparatus 18 in order to apply a suitable potential. For example, ground (+) may be connected to the HST lead extending between local wire chief position 18 and howler control circuit 17 through contacts 20 in order to effect the application of tone to the extended line through howler control circuit 17 from the source of howler tone 16.

*Test selector operation*

The test selector illustrated in detail in Figs. 6 to 17, inclusive, is arranged to make certain routine tests. In order to effect such testing, the wire chief dials the regular directory number. The first digit of the regular directory number dialed after seizure of the test selector is utilized to select a test connector, the second digit drives the step-by-step switch associated with the test connector in a primary direction and the third digit in this sequence is employed to drive the step-by-step connector in the secondary direction. At the end of this third digit, a busy indication, such as a supervisory lamp, is provided if the line is busy.

If the called line is not busy, a fourth or ringing digit is dialed in order to effect automatic testing for battery potential on the line, ground potential on the line and leakage resistance on the line as hereinbefore mentioned.

If, following these tests, it is desired to test the next line, the operator or wire chief dials the numeral 1; if it is desired to re-test the same line this result is brought about by dialing the numeral 2; if it is desired to make meter tests on the line requiring a metallic path to the line under tests, the operator or wire chief dials the digit 3; and digit 4 may be dialed in order to release the test connector with the release of the test selector. Since these tests are no part of my present invention, no detailed description is provided even though the drawings illustrate complete circuits for their accomplishment.

Assuming now that a busy line has been dialed, ground is connected in conventional manner to the sleeve lead TS (Fig. 14) which effects operation of busy test relay 810 from battery by way of the winding of relay 810, normal contacts 812, operated contacts 1231, normal contacts 1041, operated contacts 851, and normal contacts 831 to ground on the sleeve lead TS to the test connector.

Busy test relay 810 locks up to lead TS through operated transfer contacts 811 and completes at operated contacts 911 of relay 810 a circuit (hereinafter called master ground) for operating reversing relay 720 from ground by way of operated contacts M-2 of the minor switch MS (Fig. 16) and operated contacts 941 of delay relay 840 which effects the reversal of battery on tip and ring leads T and R, respectively, extending to the preceding switch banks (see Fig. 6) and connects the incoming auxiliary lead HS (Fig. 6) to the control circuit 17 thereby applying resistance ground obtained as previously indicated in trunk 10 to relay 530 in the howler control circuit (see Fig. 5).

When the ringing digit is dialed, calling bridge relay 630 follows the dial pulses. On the first restoration of relay 630, a circuit is energized for operating relay 1040 from battery through the winding of relay 1040, normal contacts 1011, 852, 841 and 631 to ground (+).

In response to the operation of relay 1040 over the foregoing circuit, relay 1530 is operated from master ground through operated contacts 1141 of relay 1040, normal contacts 1552 and 1341 and the winding of relay 1530; and relay 1210 is operated over an obvious circuit including contacts 1042 of relay 1040.

In response to the operation of relay 1210, relay 1220 operates over an obvious circuit including contacts 1211 of relay 1210.

The operation of relay 1220 effects the energization of Y-delay relay 1230 through contacts 1221.

At the end of the digit, slow-to-release relay 1040 releases after a time delay because calling bridge relay 630 opens the energizing circuit for relay 1040 at contacts 631. In turn, relays 1210, 1220, and 1230 restore.

The restoration of relay 1040 also opens the energizing circuit for relay 1530 at contacts 1141 and removes the shunt around the winding of relay 1510 at contacts 1141 whereupon relay 1510 operates in series with relay 1530 and locks to master ground.

The restoration of relay 1040 also effects the operation of toll relay 950 through its lower winding, normal contacts 912, operated contacts 1513, normal contacts 1553, operated contacts 1331, normal contacts 931, and normal contacts 1311 to master ground.

In response to the operation of relay 950, ground is connected to sleeve lead TS by way of contacts 353 and 831 in order to operate the cut-off relays in the line circuit under test and to free that line of attachments as well as to complete a circuit for operating relay 1450 through its lower winding, normal contacts 1554, operated contacts 952 and 953 in series, and normal contacts 1522 to master ground.

Responsive to the operation of relay 1450, busy tone is connected to the line from busy tone lead BT (Fig. 14) by way of capacitor C-161, operated contacts 1451, normal contacts 832, normal contacts 821 and operated contacts 813 to the ring lead R.

*Howler control circuit*

Means is provided for enabling the wire chief to monitor the line and to apply howler tone from source 16.

As previously described, relay 530 is operated over the HS lead from trunk circuit 10 through selector 11 and test selector 1. In order to connect to the line through the test selector for listening purposes, the wire chief dials a predetermined digit as "5." In response to the receipt of the first impulse of the digit "5," relay 1040 is operated on the first restoration of calling bridge relay 630 over a circuit extending through the winding of relay 1040 and normal contacts 1011, 852, 841 and 631 to ground.

In response to the operation of relay 1040, pulse assist relay 1530 is operated from master ground through operated contacts 1141 of relay 1040, normal contacts 1552 and 1341, and the winding of relay 1530.

Responsive to the operation of relay 1530 a circuit is completed for shunting relay 1340 until the end of the pulse, the right hand terminal of its lower winding being connected to master ground through operated contacts 1532 and 954, normal contacts 1333, 931, and 1311, and the left hand terminal of the lower winding being connected to ground on pulsing contacts 631 of calling bridge relay 630 by way of normal contacts 1342, operated contacts 1531, normal contacts 1341, operated contacts 1555, and normal contacts 854, 1011, 852 and 841. At the end of the pulse, the pulsing ground is removed from the left hand terminals by the opening of contacts 631 and relay 1530 holds operated and counting relay 1340 is operated from master ground through normal contacts 1556, lower winding of relay 1340, normal contacts 1342, operated contacts 1531 and winding of relay 1530 to battery.

Responsive to the operation of relay 1340, relay 1530 is de-energized by the opening of contacts 1342, whereupon relay 1530 releases; and relay 1340 locks to master ground through operated transfer contacts 1343 and its lower winding.

In response to the receipt of the second pulse of the digit, pulse assist relay 1540 is operated via a circuit extending from battery through its winding, normal contacts 1355 and operated contacts 1341 to the previously described pulsing ground at contacts 631. Counting relay 1350 is shunted down through contacts 1541 in similar manner to relay 1340 on the first pulse but operates and locks up at the end of the second pulse when relay 1540 releases.

Relays 1510 and 1520 similarly count the third and fourth pulses, thereby completing a circuit from the pulsing ground conductor (beginning at pulsing contacts 631) to pulse lead PL extending between the test selector and the howler control circuit by way of operated contacts 1341, 1351, 1511, 1521 and 1551. Hence, the fifth pulse of the digit "5" is applied to lead PL extending between test selector 1 and howler control circuit 17. Slow-to-release relay 520 is operated by this ground pulse on lead PL (Fig. 5) through contacts 531 of relay 530 and the winding of relay 520 to battery.

In response to the operation of pulsing relay 520, pulse assist relay 440 is operated over a circuit extending from ground at contacts 521 by way of normal contacts 516 and the winding of relay 440 to battery.

Responsive to the operation of relay 440, there is completed a circuit at contacts 443 for shunting out relay 510 by connecting the right hand terminal of the lower winding of relay 510 to ground through normal contracts 514, operated contacts 443, normal contacts 516, and operated contacts 521 to ground and the left hand terminal of the lower winding of relay 1510 is connected to ground through operated contacts 532; the lead to the winding of relay 430 is opened at contacts 444 so that relay 430 does not operate when relay 510 operates later; contacts 441 are opened to prevent the energization of relay 450; and ground is connected to the SW lead at contacts 442 in order to operate relay 820 in the test selector (Fig. 8) to complete a metallic connection for the tip and ring leads.

Relay 520 releases a short time after the end of the digit, which release effects the opening of the shunt for relay 510 at contacts 521. Relay 510 now operates over a circuit extending from ground at contacts 532 through the lower winding of relay 510, normal contacts 514, operated contacts 443 and winding of relay 440 to battery and locks operated from battery at its upper winding through operated contacts 514a, lower winding, and operated contacts 532 to ground. The operation of relay 510 also connects alternate ground to lead SW by way of contacts 513; closes a transmission circuit between tip and ring leads T and R respectively from the trunk circuit to leads TT and TR to the test selector and the line under test at contacts 518 and 517 by way of contacts 456 and 454 respectively so that the wire chief has a metallic path through wire chief selector 4, trunks 6 and 10, selector 11 via leads T and R, through test selector 1 into control circuit 17 and via leads TT and TR through test selector 1 and test connector 14 to line 15 and subscriber A so that the chief can monitor the line; transfers a holding circuit for relay 440 from contacts 516 to contacts 515; and connects the lower winding of start relay 410 to the start lead STG through contacts 512. Lead STG extends to the local wire chief test set 18 where ground may be applied to lead STG through contacts 19 to operate start relay 410 as determined by the operator.

In response to the operation of start relay 410, relay 410 locks up through its upper winding and operated contacts 412 and 511; auxiliary start relay 420 is operated over a circuit extending from ground through operated contacts 411 and the winding of relay 420; and at contacts 416 ground is connected to lead HT' extending to the local wire chief's test position 18 in order to provide a ground return for busy tone. Relay 440 releases in response to the release of relay 520 following the end of the ground pulse on lead PL.

In response to the operation of relay 420 a circuit is completed for energizing or otherwise causing the application of howler tone to leads HT and HR. A suitable howler tone circuit is disclosed in the co-pending application of George Elliott, Serial No. 407,908, filed February 3, 1954, and assigned to the same assignee as the present invention. In that case, ground applied to the HST lead through contacts 421 is used to complete a circuit for energizing the heaters of a plurality of electron discharge devices.

The howler control circuit is now ready for the application of howler tone to the line extending to subscriber A. This may be effected by again dialing the predetermined digit, i. e., "5," which causes another pulse to appear on lead PL to re-operate relay 520 through contacts 531.

Responsive to the reoperation of relay 520, relay 430 is operated over a circuit extending from battery through the winding of relay 430, normal contacts 444 and 452, operated contacts 516a and 521 to ground. Relay 450 is shunted down, its right hand terminal being connected to ground by way of operated contacts 532 and its left hand terminal being connected to ground through normal contacts 441, operated contacts 431, normal contacts 444 and 452, and operated contacts 516a and 521.

When relay 520 releases a short time after the end of the digit, relay 450 operates from ground at relay contacts 532 to battery by way of normal contacts 441, operated contacts 431, and the winding of relay 430 to battery, the shunt holding relay 450 unoperated having been broken at now open contacts 521.

In response to the operation of relay 450 at this time, leads HT and HR to which howler tone has been applied at howler circuit 16 are connected to leads TT and TR extending to the subscriber A through the test selector and test connector by way of operated contacts 415, 455, and 518 with respect to the tip lead and by way of operated contacts 413, 453, and 517 with respect to the ring lead. Leads HT and HR are also connected to the tip and ring leads T and R by way of contacts 418, capacitor C43, operated contacts 459 and capacitor C51 with respect to the tip lead and operated contacts 417, capacitor C42, operated contacts 457, and capacitor C52 with respect to the ring lead. The line under test is now connected to the source of howler tone 16 through the test selector 1, the test connector 14, and line circuit 15.

Means is provided for disconnecting the source of howler tone and re-establishing monitoring conditions. In order to effect this transfer, the operator may again dial the distinctive numeral, in this case, the numeral or digit "5." Relay 520 is again operated over lead PL to effect further operation of relay 440 by way of ground on contact 521 through operated contacts 516a and 451 to the winding of relay 440.

Responsive to the operation of relay 440 at this time, relay 430 is released due to the opening of contacts 441 and 444.

In response to the release of relay 430, relay 450 is de-energized at contacts 431.

In response to the restoration of relay 450, tip lead T and ring lead R are opened at contacts 459 and 457, respectively, and leads TT and TR are opened at leads 455 and 453, respectively. Tip lead TT and ring lead TR are reconnected to leads T and R, respectively, for monitoring purposes by way of contacts 456 and 454, respectively.

If it is desired to reapply the howler tone to subscriber line A, it is simply necessary to again dial the digit "5," as described previously.

Means is provided for enabling the use of the howler control circuit from the local wire chief position indicated by the numeral 18 in Fig. 1. The control circuit which enables the local wire chief to utilize the various circuits extends from the operator's key K by way of ground on the HST lead through operated contacts 20 whereby start relay 420 is energized to apply control potential to the source of howler tone through operated contact 421. When source 16 is energized, tone appears on leads HT and HR extending between source 16 and control circuit 17 and is applied to leads HT' and HR' to test position 18 through normal contacts 415a and 413a, respectively.

If it be assumed that the control circuit illustrated in Figs. 4 and 5 is in use, means is provided for returning a busy signal to central wire chief position 2 if the operator or wire chief at that place tries to seize the circuit when it is being employed from local wire chief position 18. With control circuit 17 in use, busy tone is returned from the busy tone lead BYT (Fig. 5) by way of capacitor C53, operated contacts 519, normal contacts 419 and capacitor C52 to the ring lead extending back to the central wire chief position 2.

Means is also provided for returning a busy signal to the local wire chief position if the howler control circuit has been put into use by other means. Under these conditions, relays 510 and 410 are operated so that busy tone is extended by way of capacitor C53, operated contacts 519, capacitor C41, operated contacts 414 and lead HR' to the local wire chief position 18.

Means is provided for preventing the application of howler tone to a line under test from either test position, if already in use. First, assuming that howler control circuit 17 has been seized from test position 2, relay 410 is operated. Hence, an attempt thereafter to control the howler circuit from test position 18 is ineffective to connect leads HT and HR to leads HT' and HR', respectively, because contacts 415a and 413a are open.

Means is provided for preventing the application of howler tone to leads TT and TR by an operator at test position 2 if the control circuit 17 is being used by an operator at test position 18. The operation of key K at position 18 removed ground from lead STG at contacts 19. Hence, referring back to the operation of the control circuit 17 from position 2, relays 530, 520, 440, and 510 can be operated as previously described, but relay 410 cannot operate to transfer leads HT and HR to leads TT and TR.

While I have shown and described a particular embodiment of my invention, it will be obvious to those skilled in the art that changes and modifications may be made without departing from my invention in its broader aspects, I, therefore, aim in the appended claims to cover all such changes and modifications as fall within the true spirit and scope of my invention.

What I claim is:

1. In a telephone system, a test position, impulse transmitting means at said test position, a subscriber's line, a test selector, means for connecting said test position to said line through said test selector under the control of said impulse transmitting means, means responsive to different predetermined numbers of transmitted impulses for performing various tests on said line, means responsive to the transmission of another predetermined number of impulses for connecting said test position to said line whereby an operator at said test position can monitor said line, a source of howler tone, and means responsive to again transmitting said predetermined number of impulses for connecting said source to said line.

2. The system of claim 1 in which there is provided means responsive to again transmitting said predetermined number of impulses for removing said tone from said line and restoring the monitoring connection.

3. The system of claim 2 provided with means for thereafter alternately applying said tone to said line and restoring the monitoring connection by the successive transmission of said predetermined number of impulses.

4. In a telephone system, a test position, impulse transmitting means at said test position, a subscriber's line, a test selector, means for connecting said test position to said line through said test selector under the control of said impulse transmitting means, means responsive to different predetermined numbers of transmitted impulses for performing various tests on said line, means responsive to the transmission of another predetermined number of impulses for connecting said test position to said line whereby an operator at said test position can monitor said line, a source of howler tone, a howler control circuit for controlling the connection of said howler tone to said line at the will of an operator at said test position, and means responsive to again transmitting said predetermined number of impulses for connecting said source to said line through said control circuit.

5. The system of claim 4 provided with means responsive to the further transmission of said predetermined number of impulses for restoring the monitoring connection.

6. The system of claim 5 provided with means for thereafter alternately connecting the said tone source to said line and for restoring the monitoring connection by the successive transmission of said predetermined number of impulses.

7. In a telephone system, a first test position, impulse transmitting means at said first test position, a subscriber's line, a test selector, means for connecting said first test position to said line through said test selector under the control of said impulse transmitting means, means responsive to different predetermined numbers of transmitted impulses for performing various tests on said line, means responsive to the transmission of another predetermined number of impulses for connecting said first test position to said line whereby an operator at said first test position can monitor said line, a source of howler tone, a howler control circuit, means responsive to again transmitting said predetermined number of impulses for connecting said source to said line through said control circuit, a second test position, means for seizing said control circuit from said second position, and means at said second position for controlling the application of howler tone to said line.

8. The system of claim 7 provided with a source of busy signal, and means effective when one of said positions is using said control circuit for transmitting a busy signal to the other of said positions whenever an attempt is made to seize said test selector from said other position.

9. The system of claim 7 provided with means effective when either of said positions is using said control circuit for preventing the control of said howler tone source from the other of said positions.

10. In a telephone system, a test position, a subscriber's line, a test selector, a source of howler tone, a howler control circuit, a relay in said control circuit, means for connecting said test position to said control circuit and to said line through said test selector, said connecting means including a source of marking potential, means responsive to the connection of said test position to said test selector for operating said relay from said marking potential, and means responsive to the operation of said relay for preparing said control circuit for operation from said test position.

11. In a telephone system, a test position, impulse transmitting means at said test position, a subscriber's line, a test selector, a source of howler tone, a howler control circuit, a relay in said control circuit, a switch train for extending a connection from said test position to said line through said test selector whereby predetermined tests may be made on said line, a source of potential in said train, means responsive to the transmission of impulses representing the directory number of said line from said impulse transmitting means for causing said train to extend a connection to said line and to connect said relay to said source of potential for operating said relay to prepare said howler control circuit for operation from said position, and means responsive thereafter to the transmission of a predetermined number of impulses from said impulse transmitting means for completing a monitoring connection between said test position and said line through said control circuit.

12. The system of claim 11 provided with means for thereafter connecting said tone source to said line.

13. The system of claim 12 arranged so that said tone source is connected to said line in response to the receipt of a predetermined number of impulses from said impulse transmitting means.

14. In a telephone system, a first test position, impulse transmitting means at said test position, a subscriber's line, a test selector, a source of howler tone, a howler control circuit, a relay in said control circuit, a switch train for extending a connection from said test position to said line through said test selector whereby predetermined tests may be made on said line, a source of potential in said train, means responsive to the transmission of impulses representing the directory number of said line from said impulse transmitting means for causing said train to extend a connection to said line and to connect said relay to said source of potential for operating said relay to prepare said howler control circuit for operation from said position, means responsive thereafter to the transmission of a predetermined number of impulses from said impulse transmitting means for completing a monitoring connection between said test position and said line through said control circuit, a second test position, means in said second test position for seizing said control circuit, and means effective when said control circuit has been seized from either test position for preventing control of said tone source from the other of said positions.

References Cited in the file of this patent

UNITED STATES PATENTS

| | | |
|---|---|---|
| 1,653,782 | Riggs | Dec. 27, 1927 |
| 2,377,453 | Rhoads | June 5, 1945 |
| 2,550,819 | Kessler | May 1, 1951 |